No. 12,747. REISSUED FEB. 4, 1908

O. J. FABIAN.

FLUSH TANK.

APPLICATION FILED APR. 24, 1906.

Witnesses

P. F. Nagle.

L. Douville.

Inventor

Oscar J. Fabian.

By Wiedersheim & Fairbanks

Attorneys

UNITED STATES PATENT OFFICE.

OSCAR J. FABIAN, OF PHILADELPHIA, PENNSYLVANIA.

FLUSH-TANK.

No. 12,747. Specification of Reissued Letters Patent. Reissued Feb. 4, 1908.

Original No. 808,441, dated December 26, 1905. Serial No. 245,589. Application for reissue filed April 24, 1906. Serial No. 313,520.

*To all whom it may concern:*

Be it known that I, OSCAR J. FABIAN, a citizen of the United States, residing in the city and county of Philadelphia, State of Pennsylvania, have invented a new and useful Flush-Tank, which is fully set forth in the following specification and accompanying drawings.

This invention relates to a tank and weight-controlled valve for use in connection with the bowl of a closet; and the object is a tank in which water will not stand when the device is not in use, thereby avoiding the danger of the apparatus being injured by freezing of water therein.

The invention consists in an inner receptacle arranged within the flush-tank, the water supply being discharged into the said inner receptacle, and the weight of the receptacle and the water therein operates to close the valve controlling the discharge or flush pipe. Means are also provided whereby the inner receptacle is gradually emptied into the flush-tank and the valve then opened and the tank emptied.

The device is designed to be used in connection with a bowl or apparatus whereby water is discharged into the receptacle only when the same is in use and the supply cut off when the device is not in use. As shown by me, this is done by the lifting or lowering of the bowl-cover; but as the manner of starting and stopping the flow of water in the supply-pipe is not a part of my invention and is not material I have not described the same.

My invention also consists in the novel features of construction and combination of parts hereinafter described, pointed out in the claims, and shown in the accompanying drawings, in which—

Figure 1:
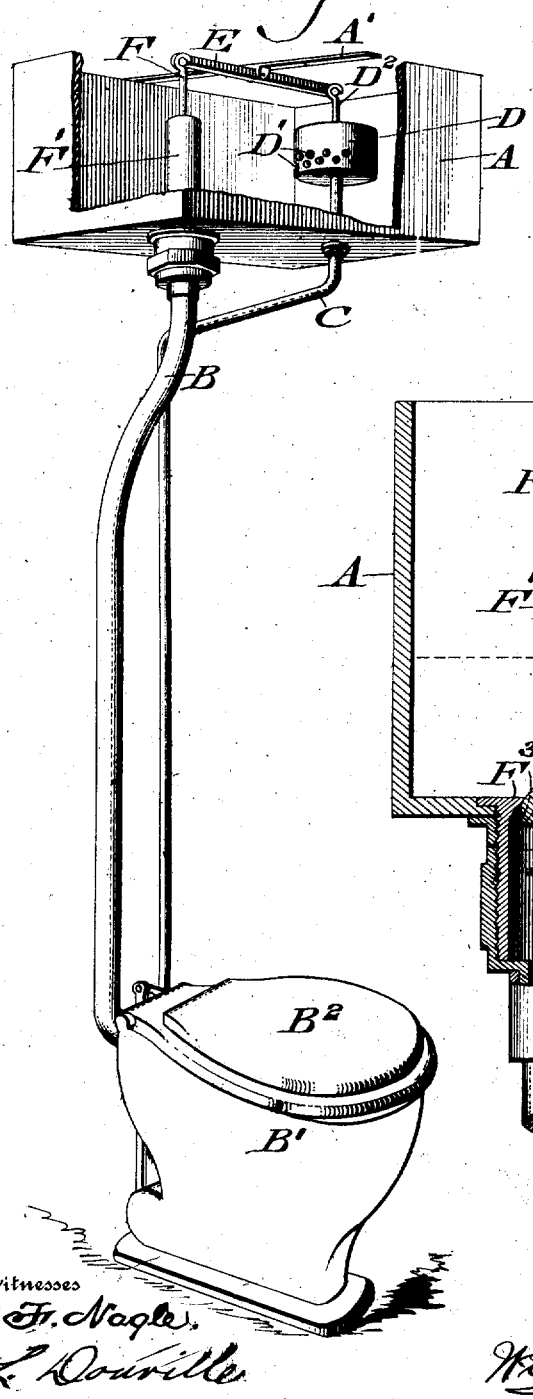
Figure 2:
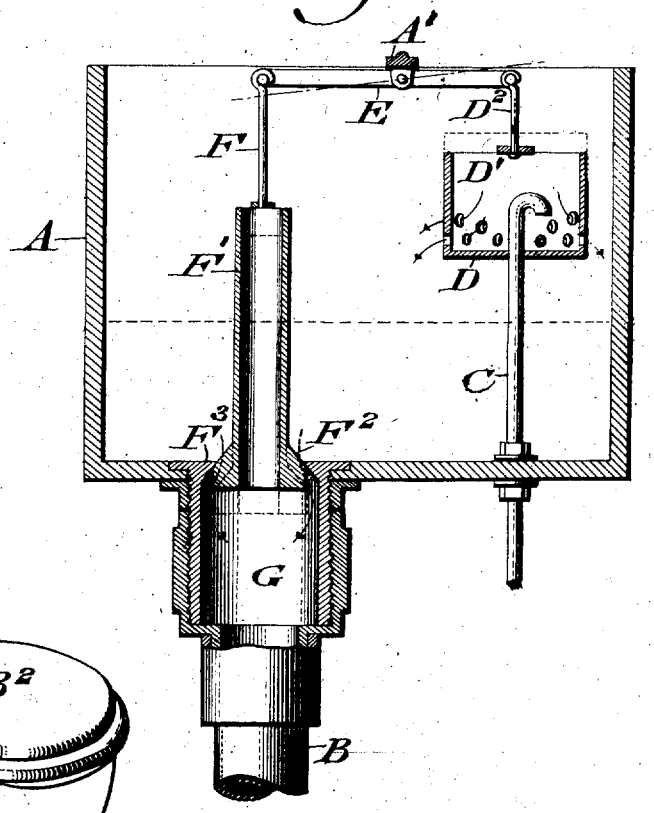

Figure 1 is a perspective view of my device, a portion of the sides of the tank being broken out. Fig. 2 is a vertical section through the tank and coöperating parts, the supply-pipe and lever being in elevation.

In the drawings, A represents the tank having a discharge-pipe B, which flushes a bowl B′. A supply-pipe C extends upwardly into the tank A, and the upper end of the pipe C is curved over and downwardly and discharges into a receptacle D, having in its sides a plurality of perforations D′, the aggregate cross-sectional area of which is less than that of the pipe C. The receptacle D is suspended by means of a hook $D^2$ to an end of a lever E, which is pivotally carried intermediate its ends by a cross-piece A′, arranged on the tank A. To the opposite end of the lever is pivoted a valve-stem F, the said stem being connected at its lower end to a tubular valve F′, which valve is provided at its lower end with a conical enlargement $F^2$, forming the valve proper and working in a plug G, carried by the bottom of the tank A, the pipe B being connected by any desirable form of union or coupling to the said plug. The valve F′, or, more accurately speaking, the enlargement of the valve seats upon a valve-seat $F^3$, formed in the upper end of the plug G.

The operation of the above-described device is as follows: The lever E, receptacle D, and valve F are normally in the position shown by the dotted lines in Fig. 2. No water can therefore stand in the tank A. When the bowl B is in use, by raising a cover $B^2$ or by any other suitable means the supply-pipe C is opened, and water is conveyed therethrough and discharges into the receptacle D. Some of this water will escape through the perforations D′ and from the tank before the weight of water in the receptacle has effected the balance of the lever E, and this water will dampen the sides of the bowl B′. As the receptacle D fills the weight of water therein will actuate the lever E and the enlargement of the valve F′ will bear on the seat $F^3$, and no water can then pass out of the tank A. The water escaping from the receptacle D through the opening D′ or by overflow will be held in the tank A until the supply through the pipe C is cut off by discontinuance of the use of the bowl, as by falling of the cover $B^2$ or in any other desired manner, and as the water drains from the receptacle D the valve F′ by its weight will drop into its normal position and the water which has accumulated in the tank will escape through the pipe B and flush the bowl, the tank A being entirely emptied. If for any reason the supply of water is not cut off in the pipe C, the tank A will be prevented from overflowing by reason of the tubular construction of the valve F, the surplus passing out of the tank through the said valve without its leaving its seat.

Having thus described my invention, what I claim as new and desire to secure by Letters Patent, is:—

1. A device of the kind described, comprising a flush tank, a supply pipe, a discharge pipe, a pivoted lever, an apertured pipe-valve suspended from said lever upon one side of its pivot, and a receptacle carried by the lever and adapted to receive water from the supply and adapted to actuate the valve by reason of the weight of the water, said receptacle being perforated to permit the escape of a portion of the water prior to actuation of the valve.

2. A device of the kind described comprising a tank, a discharge-pipe, a valve therein, a supply-pipe, and a receptacle arranged within the tank and normally receiving the end of the supply pipe and adapted to receive the contents of the supply-pipe, means whereby the weight of water in the said receptacle closes the valve, said receptacle being perforated for permitting escape of a portion of the contents of the receptacle prior to the closing of the valve.

3. In a device of the character described, a flush tank, a supply pipe, a lever suitably fulcrumed, a rising and falling perforated receptacle carried by said lever and normally and at all times receiving the end of the supply pipe and adapted to receive water therefrom, an outlet from said tank, and an open-ended pipe having a portion thereof adapted to serve as a valve for closing said outlet, said pipe being connected to said lever and being seated by the upward movement of the pipe.

4. In a device of the character described, a flush tank, an outlet leading from the bottom thereof, a pipe apertured at its upper portion and having a valve around its lower end adapted to control said outlet and to be seated by upward movement, a lever to which the pipe is secured, an apertured receptacle, a support therefor depending from said lever, and a pipe having its discharge end normally received within and discharging into said receptacle.

5. In a device of the character described, a flush tank, an outlet leading from the bottom thereof, a pipe apertured at its upper portion and having a valve around its lower end adapted to control said outlet and to be seated by upward movement, a lever to which the pipe is secured, an apertured receptacle supported from said lever, and a pipe having its discharge end normally received within and discharging downwardly into said receptacle.

6. In a device of the character described, a flush tank having an outlet therefrom, a lever suitably fulcrumed, a hollow valve having an opening in its upper portion adapted to control said outlet and to be seated by upward movement, an apertured receptacle supported from said lever, and a supply pipe having its discharge end normally received within and adapted to discharge into said receptacle.

OSCAR J. FABIAN.

Witnesses:
W. H. Hood,
Robert E. Fabian.